Aug. 15, 1933. C. M. EBERLING 1,922,474
MACHINE FOR MOLDING AND PRESSING BRICKS OR BLOCKS
Filed Oct. 10, 1931 6 Sheets-Sheet 2

INVENTOR
CHARLES M. EBERLING
BY
Fisher, Moser + Moore
ATTORNEY

Aug. 15, 1933.   C. M. EBERLING   1,922,474
MACHINE FOR MOLDING AND PRESSING BRICKS OR BLOCKS
Filed Oct. 10, 1931   6 Sheets-Sheet 3
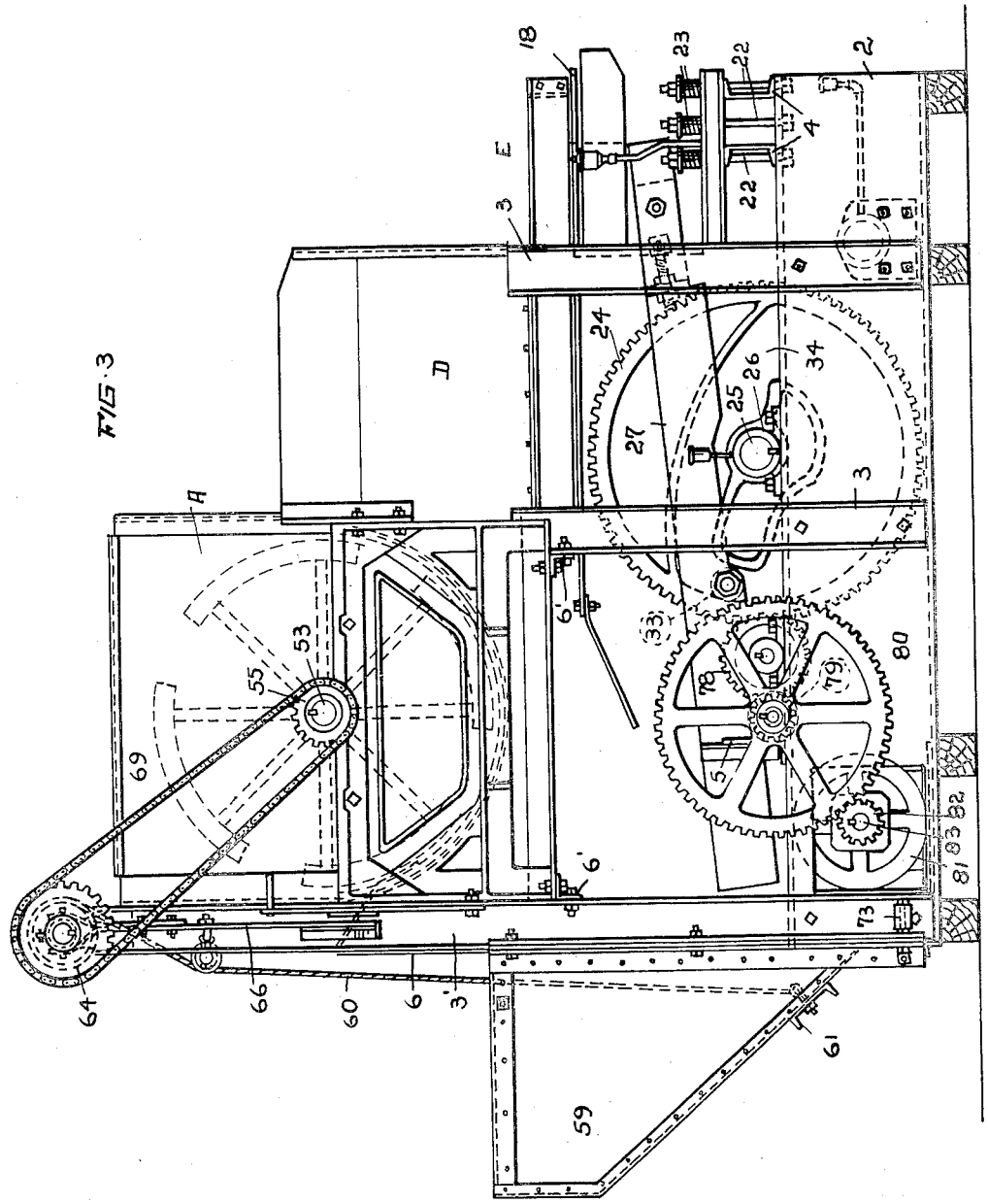
INVENTOR
CHARLES M. EBERLING
BY
ATTORNEYS Aug. 15, 1933.    C. M. EBERLING    1,922,474
MACHINE FOR MOLDING AND PRESSING BRICKS OR BLOCKS
Filed Oct. 10, 1931    6 Sheets-Sheet 4
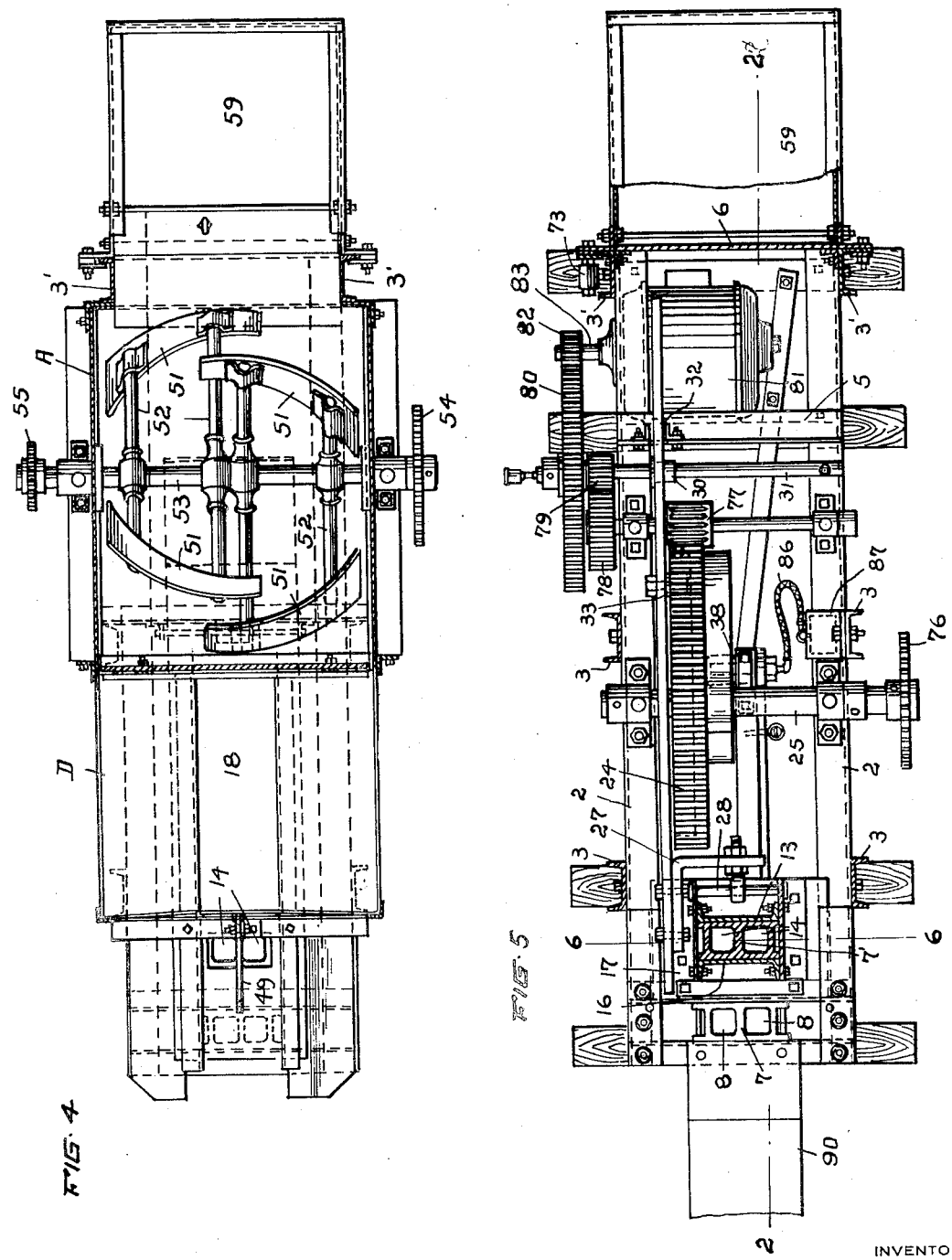
INVENTOR
CHARLES M. EBERLING
BY
ATTORNEYS Aug. 15, 1933.    C. M. EBERLING    1,922,474
MACHINE FOR MOLDING AND PRESSING BRICKS OR BLOCKS
Filed Oct. 10, 1931    6 Sheets-Sheet 5
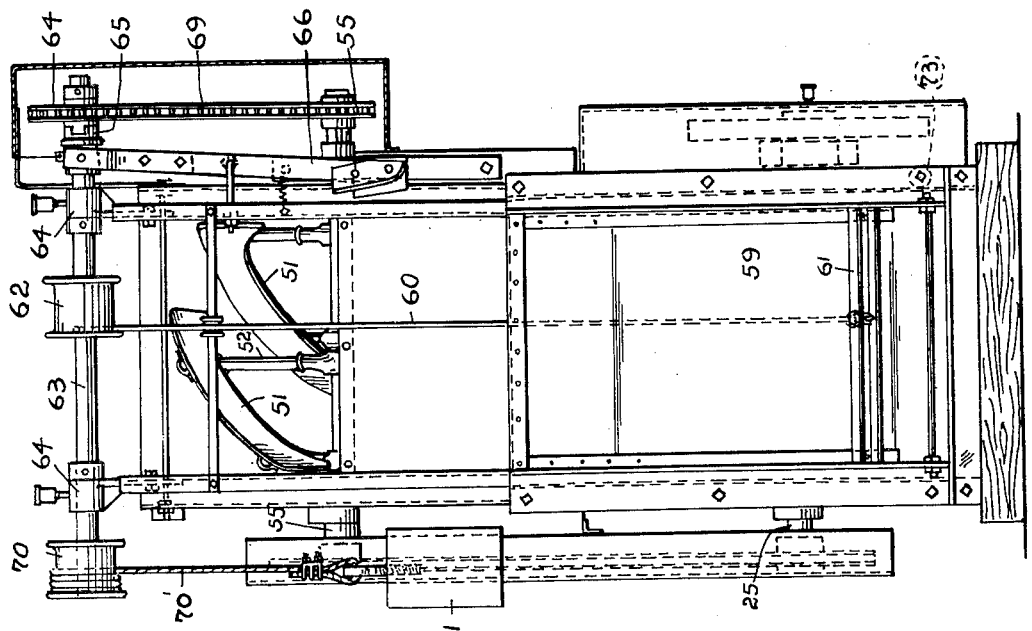
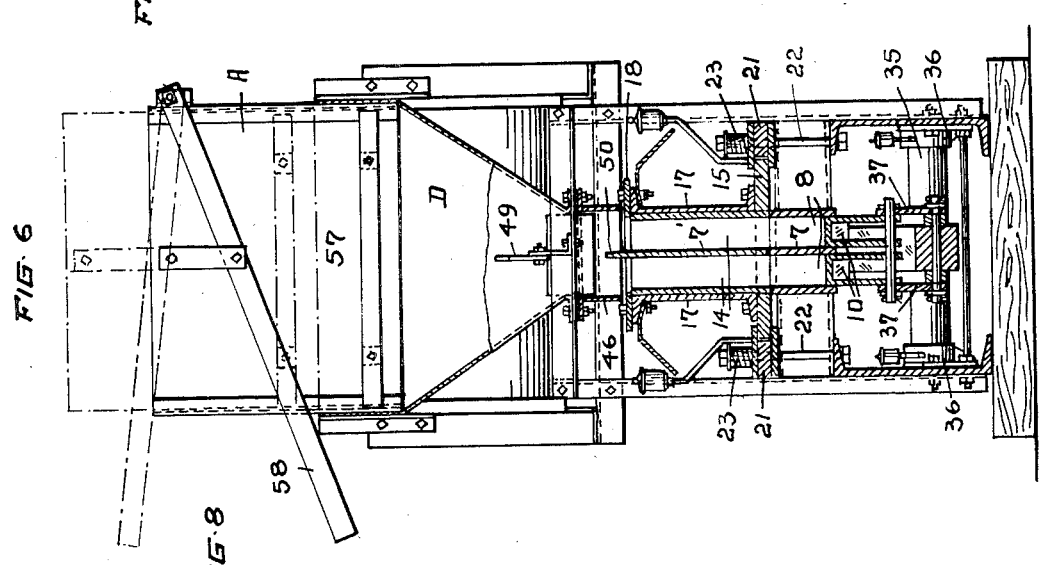
INVENTOR
CHARLES M. EBERLING
ATTORNEYS

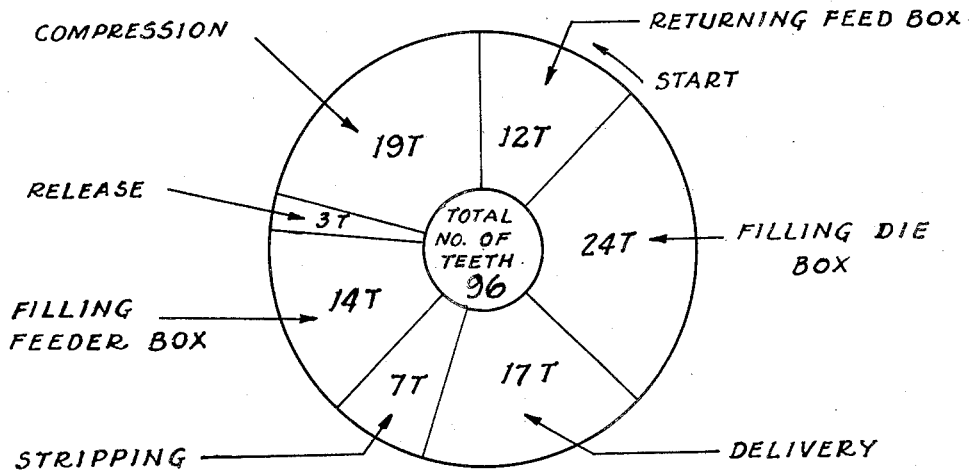
DIAGRAMATIC SYSTEM OF OPERATIONS
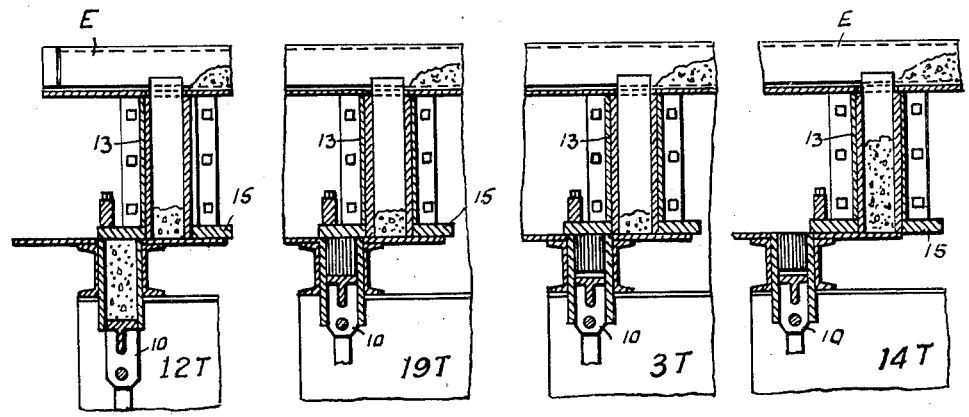
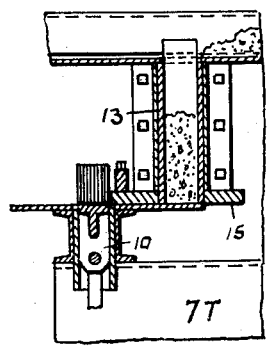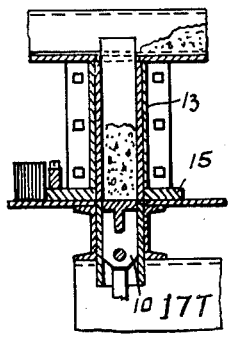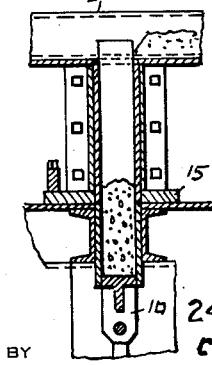

Patented Aug. 15, 1933

1,922,474

UNITED STATES PATENT OFFICE 1,922,474

MACHINE FOR MOLDING AND PRESSING BRICKS OR BLOCKS

Charles M. Eberling, Cleveland, Ohio

Application October 10, 1931. Serial No. 568,145

7 Claims. (Cl. 25—87)

Figure 1:
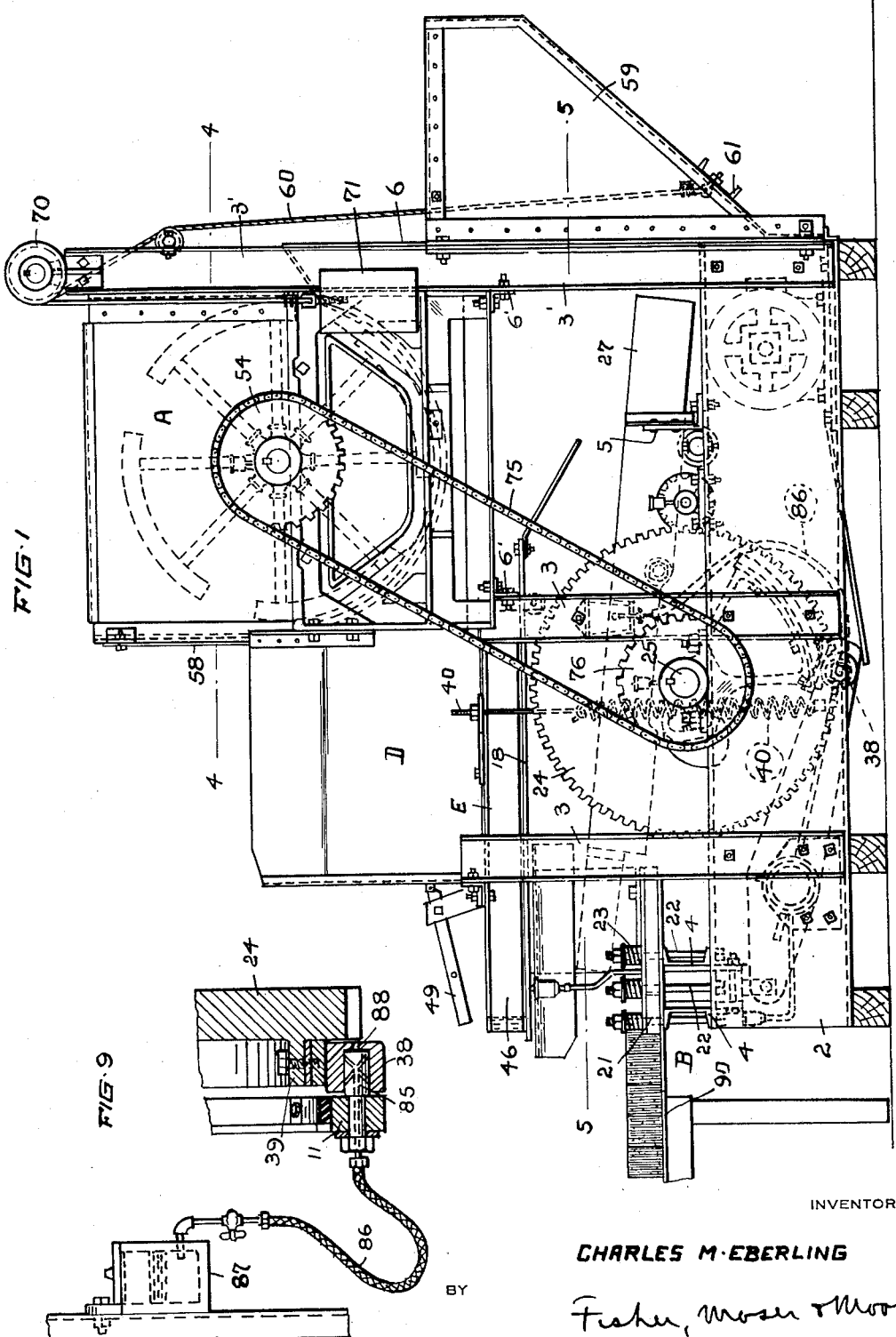
Figure 2:
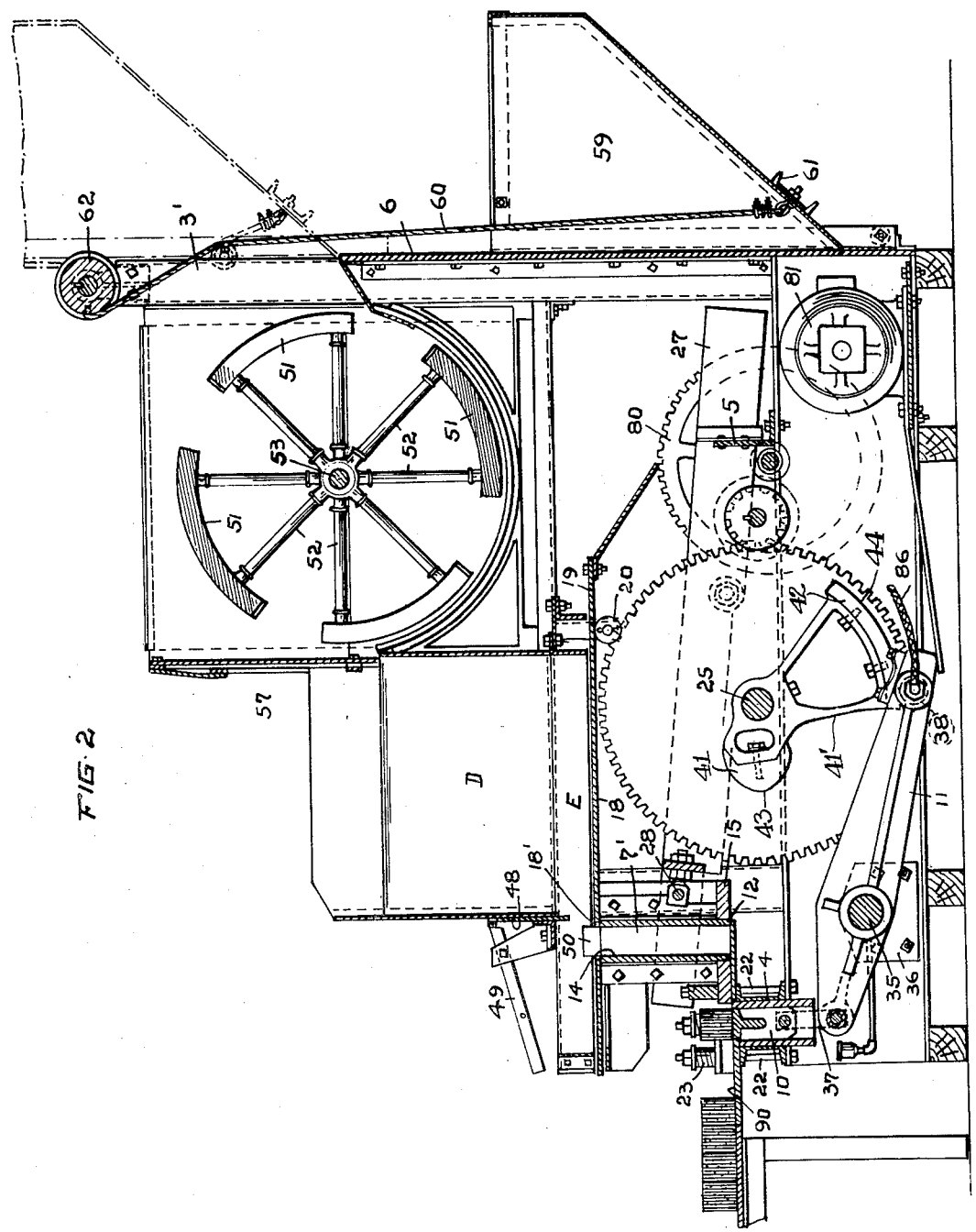

This invention relates to new and useful improvements in apparatus designed for molding and pressing substantially dry and moldable compounds, such as coal dust, concrete, or other mixtures of granular or porous form and has for its primary object and purpose to provide an automatic machine in which such compounds may be compressed to form bricks or blocks of proper density. As designed the machine includes means to automatically make up and thoroughly work a compound, or mixture, such as coal dust and a binder, to feed such compound mixture at intervals into a mold box, to compress the mixture, to strip the formed product from the mold box and to discharge the product. All steps, such as feeding the material into the mold box, forming same and stripping and discharging the finished product take place, according to the invention, in a continuous cycle and are so timed that a single operator can run the machine. Thus, the steps referred to above are completed during one rotation of a master gear provided with cam arrangements at opposite sides, and compressing of the compound and stripping of the finished block or brick is accomplished by one lever system. To the attainment of these ends and the accomplishment of other new and useful objects as will later appear, the invention consists in the novel features of construction, combination and arrangement of parts hereinafter more fully described and claimed and shown in the accompanying drawings, illustrating the invention, and in which Figure 1 is a side elevation of the machine constructed in accordance with the principles of the invention. Fig. 2 is a longitudinal sectional view on line 2—2 of Figure 5. Figure 3 is a side elevation showing the other side of the machine. Figures 4 and 5 are horizontal sectional views on lines 4—4 and 5—5 of Figure 1. Figure 6 is a vertical sectional view on line 6—6 of Figure 5; Figure 7 a rear view of the machine; and Figure 8 a detail sectional view showing the clutch lever arrangement for the chute. Figure 9 is a detail sectional view showing the oil feeding system for the power roller. Figures 10 through 17 show rather diagrammatically the operating cycle of the machine and the positions of the feed box and plunger arrangement during such cycle.

Referring to the drawings, it will be noted that the machine comprises a rigid main frame of iron or steel beams bolted together, including a supporting base composed of two horizontal channel beams 2, two pair of vertical beams or members 3—3' bolted to beams adjacent the front end thereof, cross beams 4 affixed to and spanning beams 2 at the front end of the machine, cross beam 5 close to the rear end thereof and a back plate 6, bolted to vertical beams or members 3' at the rear end of beams 2. The frame also includes at its rear portion a mixer A supported in elevated position upon angle beams 6 bolted to the vertical side members 3—3', the latter of which are of substantially greater length than the side members 3.

Cross beams 4 at the front of the machine are spaced to seat an elongated box or mold B rigidly secured to such beams and divided centrally by a wall 7 to provide a pair of molding chambers 8 within its opposite ends. These molding chambers are open at their tops, whereas the bottoms thereof are closed by reciprocatory pistons 10 slidably operating in said chambers and linked to a power lever 11 by means of links 37. The open tops 9 of chambers 8 are aligned with the bottom edge 12 of a reciprocating feeder box 13 also sub-divided by a central wall 7' to provide a pair of feeding chambers 14 within its opposite ends. The cross section of chambers 8 and chambers 14 is the same and these chambers are so aligned with respect to each other that during reciprocatory movement of feeder box 13, these chambers will at a predetermined time form a continuous channel and permit unrestricted feeding of material into molding chambers 8.

Reciprocatory feeding box 13 is attached to and supported by a solid centrally perforated base plate 15, sleeved over and aligned with the lower edge of said box and connected therewith by channel beam sections 16 and 17, while the upper end of box 13 is secured to a feeder plate 18, having perforations 12' conforming to and registering with the feeding chambers 14. The plate 18 is slidably supported adjacent its rear end 19 upon a roller 20, mounted on the main frame of the machine. The structure just described is guided within slides 21 engaging the opposite sides of base plate 15, and yieldingly attached to channel beams 2 by bolts 22, having compression springs 23. It is essential that the plate 15 be capable of yielding slightly on the compression stroke to avoid damage to the parts under abnormal pressures.

The reciprocatory movement of feeder box 13 is effected and controlled by a rotatable master cam gear 24, mounted on shaft 25, supported in bearings 26 on channel beams 2, a reciprocatory lever 27, pivotally connected to a cross shaft 28 at the rear of feeder box 13, and slidably supported upon a roller 30 on shaft 31 being employed to impart reciprocatory movement to feeder box 13. Lever 27 is guided in and extends through a slot 32 of angular cross beam 5 and supports at its inner face a roller 33 extending into and co-acting with an endless cam channel 34 on one side of gear 24, so that rotation of said gear induces reciprocatory movement of the feeder box, its base plate 15 and feeder plate 18. Master cam gear 24 also oscillates lever 11, rigidly attached to shaft 35, in turn mounted in bearings 36, bolted to channel beams 2. The lever 11 supports the reciprocatory pistons 10 at its front end and at the rear end thereof bears a roller 38 actuated by and contacting with a multi-faced cam member 39 integrally formed on one side of the master cam gear 24. A tension spring 40 attached at its lower end to the rear end of lever 11, and at its upper end secured to the frame by means of an adjustable bolt 40', maintains the roller 38 in continuous contact with cam means 39.

During one revolution of gear 24 lever 11 produces a short power or compression stroke of pistons 10 and a longer stripping or discharging stroke of such pistons. The latter is designed to impart a short power or compression stroke to the pistons and also a longer stripping or discharging stroke, during each revolution of the gear 24. Thus, the cam member 39 is provided with removable steel shoes 41 and 42 having cam faces 43 and 44 which regulate the length of stroke imparted to the piston by lever 11. The cam face 43 is specifically designed to govern the compression stroke while the top of the mold 8 is closed and the cam faces 41' and 44 govern the length and time of the stripping stroke. Shifting of feeder box 13 and thereby closing or opening of the top ends of mold chambers 8 is so timed that the compression stroke of pistons 10 occurs when chambers 8 are closed, whereas stripping of these chambers takes place when the tops thereof are entirely open and free to discharge the finished product.

The coal dust and cementitious mixture is automatically supplied or fed to feeder box 13 from a mixer A through a chute or hopper D extending into an elongated channel E formed by parallel angle irons 46. The feeder plate 18 serves as a bottom member for the channel E and consequently during forward movement of the feeder plate the material resting thereon is shifted forwardly with respect to the material within hopper D. The empty space in the rear of channel E, created by the forward shifting of feeder plate 18 as described fills up automatically. On the return stroke the feeder box 13 is moved under that portion of the channel E into which the charge of material has just been delivered, and in position to convey the material into the feeder box chambers 14, from which delivery to molding chambers 8 takes place at the next forward movement of box 13. A vertically movable gate 48 controlled by a hand lever 49 regulates the amount of material to be conveyed by the forward movement of feeder plate 18, and breaking up of such material and proper feeding of equal amounts thereof into feeding chambers 14 is effected by means of a thinned extension 50 of central wall 7' of feeder box 13.

Mixer A for mixing the compound to be molded may be constructed in any ordinary way but as shown includes a series of inclined blades 51 attached by connection rods 52 to a central shaft 53 extending at opposite sides through the mixer. The opposite ends of shaft 53 bear sprockets 54 and 55, 54 being the drive sprocket for the mixer and 55 a power take-off sprocket, the purpose of which will later be described. The front wall 56 of mixer A includes a vertically shiftable gate 57 controlled by a hand lever 58 to permit filling of hopper D and the rear wall of mixer A is partly cut away to place a loading bucket 59 in communication with the mixer. The bucket 59 is slidably interengaged with beams or members 3', and back plate 6 which forms the front wall of said bucket. The bottom of bucket 59 is inclined for free discharge of its contents.

As described above bucket 59 is slidably supported to permit raising and lowering thereof during charging operations, and to facilitate movement of the bucket a cable 60 is provided. This cable is attached to a re-enforcing channel iron 61 secured to the bucket and travels over a drum 62 mounted on shaft 63, pivotally supported in bearing 64 in turn attached to the tops of side members 3'. Shaft 63 carries a freely rotatable sprocket wheel 64, a slidable clutch mechanism 65 being provided to couple sprocket 64 with shaft 63 if so desired. A hand lever 66 pivotally mounted at 67 shifts clutch mechanism 65, and a tension spring 68 tends to hold this mechanism in engagement with sprocket 64, driven by a chain 69 from power take-off sprocket 55. Shaft 63 also bears at its free end a drum 70 over which a cable 70' travels and to the end of which is attached a counterweight 71.

To prevent breaking of bucket 59 or of cable 60, when such bucket is raised to its highest position, automatic mechanism is provided to shift clutch mechanism 65 out of engagement with sprocket 64. Thus, lever 66 supports at its lower portion a cam member 72 co-acting with a roller 73 mounted on bucket 59, which roller by engaging the inclined cam surface 74 of member 72 oscillates lever 66 and thereby automatically disconnects clutch mechanism 65 from sprocket wheel 64, when bucket 59 is raised to its proper height. Sprocket gear 54 on shaft 53 is coupled by chain 75 to drive sprocket 76 on shaft 25, and master cam gear 24 on shaft 25 is driven by electric motor 81 through gear train 77, 78, 79 and a gear 82 engaging with gear 80 mounted on its shaft 83. As power roller 38 and its cam, which impart oscillating movements to lever 11, undergo substantial stresses, specific care is taken to assure sufficient lubrication of such roller and its cam by a gravity lubricating system. Thus, shaft 85 of roller 38 is perforated and communicates through rubber hose 86 with a lubricant container 87, mounted in a plane above roller 38. The rear wall of roller 38 is perforated at 88 to permit lubrication of the contacting surfaces of the cam.

The operation of the machine may be readily understood from the foregoing description, but briefly recapitulating, it consists of a series of steps and operations as specifically disclosed in the diagrammatical views of Figs. 10 through 17 of the drawings.

Thus, Fig. 10 shows the complete cycle of operations actuated by a single rotation of the master cam gear 24, the first operation being to close molding chambers 8 by advancing feed box 13 and simultaneously advancing a full charge of material into elongated channel E. In the second operation the charge of the mold box is compressed until the desired density of the material is obtained, the compression springs 23 preventing breakage of parts. The compression pressure is now released to permit backward sliding movement of feeder box 13 and to simultaneously charge feed box 13 with the material previously advanced in elongated channel E. The tops of molding chambers 8 at this time are not covered by base plate 15, and consequently are open to permit the formed bricks to be forced upwardly out of chambers 8, by the stripping action of plungers 10. In the following forward movement of feeder box 13, its chambers 14 are brought into alignment with molding chambers 8 and the finished bricks are simultaneously pushed forward upon table 90, arranged at the front of the machine and from which the bricks may be carried to storage or drying rooms. The cycle of operations closes with the return of plungers 10 to their lowest position to enable a full load to be supplied to molding chambers 8.

What I claim, is:

1. A machine for molding and pressing bricks or blocks, comprising a frame, a stationary mold box open at its top and bottom mounted on said frame, a horizontally shiftable and vertically yielding top plate for said mold box slidably mounted in said frame, a vertically shiftable bottom for said mold box and means to shift said bottom to differently stepped elevations for compressing the contents of said box when said top plate closes said mold box and for stripping the compressed product, when the top of said mold box is open.

2. A machine for molding and pressing bricks or blocks including a mixer, vertically shiftable feeding means for said mixer, a hopper opposite said mixer having its front wall shortened and extending into an elongated channel, a reciprocatory base plate for said channel, to permit lateral shifting of the contents of the hopper in one direction by reciprocatory movement of said bottom, a feeder box attached to and reciprocating with said bottom, a stationary mold box arranged in a plane below said feeder box and adapted to be placed in alignment therewith during reciprocating movements of said feeder box and means to compress and strip the contents of said mold box.

3. In a machine of the type described, a hopper, and an elongated channel below said hopper having a reciprocating bottom, the bottom edges of the front wall of said hopper being spaced above the bottom of said channel and including vertically adjustable means to adjust the lower edge of said front wall with respect to said bottom to control the amount of material laterally moved in said channel by the reciprocating action of said bottom.

4. A machine for molding and pressing bricks or blocks, comprising a stationary mold box having an open top and a verticaly shiftable bottom, means to raise and lower said bottom to different elevations including an oscillatory lever and a rotatable cam member for operating said lever, a horizontally reciprocating plate aligned with the top of said mold box and shiftable to open and close said top and means to reciprocate said plate including a lever and rotatable cam member to actuate said lever.

5. A machine for molding and pressing bricks or blocks, comprising a hopper, a stationary mold box having an open top and a vertically shiftable bottom, a reciprocatory feeder box for transmitting charges of material to said mold box, means for transmitting predetermined charges from said hopper to said feed box, and means to raise and lower said bottom of said mold box to different elevations during intervals of rest of said reciprocatory feeder box.

6. In a machine according to claim 5, a feeder box having a perforated base plate attached thereto and guiding means for said plate to permit shifting of said plate over said mold box and closing of said mold box and to resist upward movement of said base plate, when the material in said mold box is under compression, said guiding means including yieldingly supported top members to yieldingly resist compression of the material.

7. In a machine of the type described, a hopper, an elongated channel below said hopper having a reciprocating bottom provided with an opening arranged in forwardly offset relation with respect to said hopper, a horizontally shiftable feeder box rigidly connected to said reciprocating bottom opposite said opening, the bottom edge of said wall of said hopper being spaced above the bottom of said channel to permit forward movement of material in said channel by the reciprocating action of said bottom and indirect feeding of material from said hopper to said feeder box, and said front wall being provided with a vertically movable gate to adjust the space between the lower edge of said front wall and the bottom of said channel for controlling the amount of material indirectly fed from said hopper to said feeder box.

CHARLES M. EBERLING.